(12) United States Patent
Bates et al.

(10) Patent No.: US 8,775,691 B1
(45) Date of Patent: *Jul. 8, 2014

(54) DETECTING FIRMWARE VERSION FOR AN INPUT/OUTPUT ADAPTER

(71) Applicant: International Business Machines Corporation, Armonk, NY (US)

(72) Inventors: Cary L. Bates, Rochester, MN (US); Justin K. King, Rochester, MN (US); Lee Nee, Rochester, MN (US); Michelle A. Schlicht, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/718,326

(22) Filed: Dec. 18, 2012

(51) Int. Cl.
*G06F 3/00* (2006.01)

(52) U.S. Cl.
USPC ........ 710/16; 710/8; 710/14; 710/15; 710/19; 710/104; 710/300; 710/301; 710/302; 710/313; 710/314; 710/315

(58) Field of Classification Search
None
See application file for complete search history.

(56) References Cited

U.S. PATENT DOCUMENTS

| | | | | |
|---|---|---|---|---|
| 5,559,965 A * | 9/1996 | Oztaskin et al. | | 710/104 |
| 5,613,130 A * | 3/1997 | Teng et al. | | 713/300 |
| 5,809,518 A * | 9/1998 | Lee | | 711/115 |
| 5,832,207 A * | 11/1998 | Little et al. | | 726/36 |
| 6,101,322 A * | 8/2000 | Goodrum et al. | | 710/302 |
| 6,401,157 B1 * | 6/2002 | Nguyen et al. | | 710/302 |
| 6,532,506 B1 * | 3/2003 | Dunstan et al. | | 710/100 |
| 7,111,102 B2 * | 9/2006 | Doak et al. | | 710/305 |
| 7,310,695 B2 * | 12/2007 | Epps et al. | | 710/305 |
| 7,433,988 B2 * | 10/2008 | Doak et al. | | 710/305 |
| 2006/0277346 A1 * | 12/2006 | Doak et al. | | 710/305 |
| 2008/0129577 A1 * | 6/2008 | Pan | | 341/175 |
| 2008/0309507 A1 * | 12/2008 | Anderson et al. | | 340/679 |
| 2010/0277104 A1 * | 11/2010 | Lin et al. | | 315/312 |
| 2011/0115475 A1 * | 5/2011 | Li | | 324/140 R |
| 2011/0271267 A1 | 11/2011 | Excoffier et al. | | 717/168 |
| 2012/0042120 A1 * | 2/2012 | Ni et al. | | 711/103 |
| 2012/0131256 A1 * | 5/2012 | Dai et al. | | 710/316 |
| 2012/0222026 A1 | 8/2012 | Excoffier et al. | | 717/172 |

FOREIGN PATENT DOCUMENTS

| | | | | |
|---|---|---|---|---|
| EP | 1657622 A1 | 5/2006 | | G06F 1/26 |
| EP | 1881405 A2 | 1/2008 | | G06F 9/45 |
| TW | 201248169 A | * 12/2012 | | |

OTHER PUBLICATIONS

'Mellanox Firmware Tools (MFT) Users Manual' Rev 0.40, copyright 2006, Mellanox Technologies, Inc.*
'A Power Benchmarking Framework for Network Devices' by Priya Mahadevan et al., IFIP International Federation for Information Processing 2009.*

(Continued)

*Primary Examiner* — Steven Snyder
(74) *Attorney, Agent, or Firm* — Richard A. Wilhelm; James R. Nock

(57) ABSTRACT

An indication of a version of a firmware stored in an input/output adapter may be provided by a method that includes detecting whether a first pin is connected to an external circuit, detecting whether a second pin is unconnected to an external circuit, and causing the indication to be provided if the first pin is connected and the second pin is unconnected. The indication may be provided on the first pin. The first pin may include a power supply pin and the indication may be an average rate of power supplied to the input/output adapter.

12 Claims, 2 Drawing Sheets

(56) References Cited

OTHER PUBLICATIONS

'Transmitting Data and Power over a One-Wire Bus' by Dan Awtrey, Dallas Semiconductor, reprinted from SENSORS, Feb. 1997.*

Anonymous, "Method for a circuit and apparatus for detecting power loss and generating a dying-gasp message", IP.Com Prior Art Database, IP.Com No. IPCOM000008683D, Electronic Publication Jul. 2, 2002. http://www.ip.com/pubview/IPCOM000008683D.

Anonymous, "A mechanism to easily identify down-level adapter FCode", IP.Com Prior Art Database, IP.Com No. IPCOM000207967D, Electronic Publication Jun. 16, 2011. http://priorartdatabase.com/IPCOM/000207967.

IBM TDB, "Method and apparatus for scheduling dynamic trace groups to reduce peak power dissipation", IP.Com Prior Art Database, IP.Com No. IPCOM000016149D, Original Publication Sep. 23, 2002, Electronic Publication Jun. 21, 2003. http://www.ip.com/pubview/IPCOM000016149D.

IBM, "IBM Flex Ssytem FC5022 2-Port 16Gb FC Adapter User's Guide", 2nd Edition, 2012, © Copyright IBM Corporation 2012.

Mellanox's 'InfiniHost PCI-X Low Profile RoHS HCA Adapter Cards User Manual' Rev. 1.3, copyright 2010, Mellanox Technologies.

* cited by examiner

DETECTING FIRMWARE VERSION FOR AN INPUT/OUTPUT ADAPTER

FIELD

This disclosure relates generally to input/output ("I/O") interface devices.

BACKGROUND

I/O interface devices or units support communication between a computer system and a variety of I/O devices. Examples of I/O devices include terminal devices, such as video display devices or speakers, and user input devices, such as a keyboards, mice, keypads, touch pads, trackballs, buttons, light pens, or other pointing devices. Other examples of I/O devices are storage devices, such as disk drives or direct access storage devices, which are typically rotating magnetic disk drive storage devices, although they may be other storage devices, including arrays of disk drives configured to appear as a single large storage device to a host computer. Further examples of I/O devices are various other input/output devices, such as printers or fax machines. Yet other examples of I/O devices are network interface devices that provide one or more communications paths from a computer system to other digital devices and computer systems. The communication paths may include one or more networks, e.g., an Ethernet network.

I/O interface devices or units are also known as I/O processors or I/O adapters. An I/O interface device may be integrated into a system-on-a-chip or provided on a mother board of a computer system. In addition, an I/O interface device may be manufactured as a standalone circuit board having a connector for installing the device into a slot or socket (e.g., a complementary connector) on a mother board of a computer system.

SUMMARY

One embodiment is directed to a method for providing an indication of a version of a firmware stored in an input/output adapter. The method may include detecting whether a first pin is connected to a circuit external to the input/output adapter. In addition, the method may include detecting whether a second pin is unconnected to a circuit external to the input/output adapter. Moreover, the method may include causing the input/output adapter to provide the indication if the first pin is connected and the second pin is unconnected. The indication is provided on the first pin. In one embodiment, the first pin may include a power supply pin and the indication may be an average rate of power supplied to the input/output adapter.

Other embodiments are directed to a computer readable storage medium for providing an indication of a version of a firmware stored in an input/output adapter and to an input/output adapter operable to provide an indication of a version of a firmware stored in the input/output adapter.

BRIEF DESCRIPTION OF THE SEVERAL VIEWS OF THE DRAWINGS

In the drawings and the Detailed Description, like numbers generally refer to like components, parts, steps, and processes.

DETAILED DESCRIPTION

Figure 1:
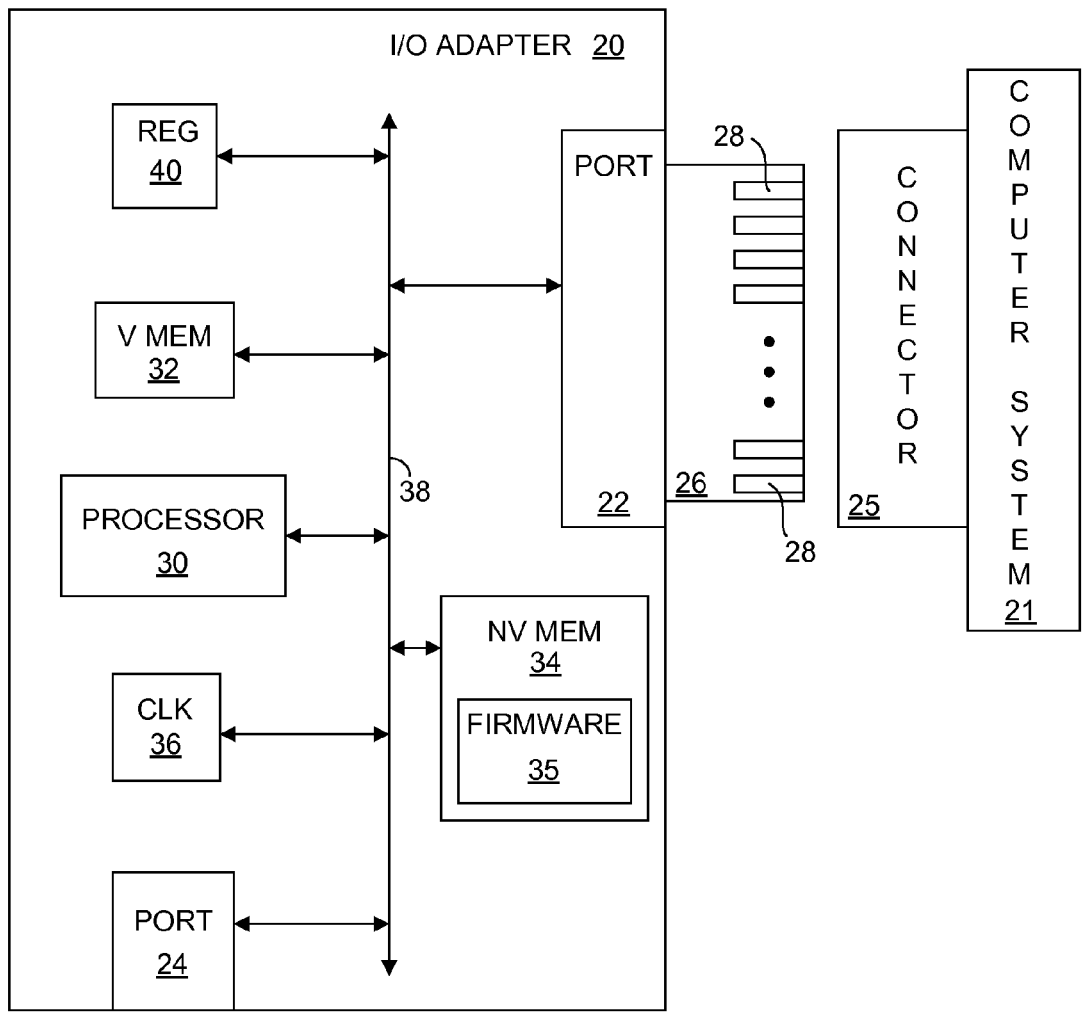
FIG. 1 is a block diagram illustrating an embodiment of an I/O adapter in which embodiments of the present invention may be implemented.

FIG. 1 is a block diagram illustrating an embodiment of an I/O adapter in which embodiments of the present invention may be implemented. The exemplary I/O adapter 20 illustrated in FIG. 1 may include a circuit board on which various components may be mounted. The I/O adapter 20 may include a port 22 for communicative coupling with a computer system 21. In various embodiments, the computer system 21 may be a multi-user mainframe computer system, a single-user system, or a server computer or similar device that has little or no direct user interface, but receives requests from other computer systems (clients). In other embodiments, the computer system 21 may be implemented as a desktop computer, portable computer, laptop or notebook computer, tablet computer, or any other appropriate type of electronic device. In yet other embodiments, the computer system 21 may be an "embedded system" or controller, such as one that may be provided in a traffic light, consumer or industrial appliance, motor vehicle, aircraft, train, boat, robotic device, telecommunications equipment, medical device or equipment, sensing device, electric motor, or any other device having an embedded system.

The port 22 may have one or more connectors 26 for coupling with a corresponding complementary connector 25 (or connectors) on another circuit board, such as on a mother board of the computer system 21. In one embodiment, the connector 26 may be an edge connector having two or more "pins" 28. In embodiments in which the connector 26 is an edge connector, the complementary connector may include a plurality of conductive surfaces in a socket or a slot, each surface corresponding with one of the pins 28. As one example, the connector 26 may be a Peripheral Component Interconnect Express (PCIe) edge connector and the complementary connector 25 may be a PCIe slot. It should be understood, however, that the connector 26 may be a connector of any desired type, such as one that conforms to the USB, PCI, RapidIO, InfiniBand, or any other desired standard.

It should be understood that the connector 26 is optional and may be omitted in some embodiments. In embodiments in which the connector 26 is omitted, the pins 28 may be connection points. As one example, the I/O adapter 20 may be integrated into a multipurpose circuit board and the pins 28 may correspond with connection points to various nodes of the circuit board.

One example of the pins 28 that may be included on a connector 26 is shown in Table 1 below, which describes the pinout of an exemplary 1×PCIe connector. The pinout may be part of the PCIe standard promulgated by the Peripheral Component Interconnect Special Interest Group (PCI-SIG).

TABLE 1

| Pin # | Side B Connector | | Side A Connector | |
| --- | --- | --- | --- | --- |
| | Name | Description | Name | Description |
| 1 | +12 v | +12 volt power | PRSNT#1 | Hotplug detect |
| 2 | +12 v | +12 volt power | +12 v | +12 volt power |
| 3 | +12 v | +12 volt power | +12 v | +12 volt power |
| 4 | GND | Ground | GND | Ground |
| 5 | SMCLK | SMBus clock | JTAG2 | TCK |
| 6 | SMDAT | SMBus data | JTAG3 | TDI |
| 7 | GND | Ground | JTAG4 | TDO |

TABLE 1-continued

| Pin # | Side B Connector | | Side A Connector | |
|---|---|---|---|---|
| | Name | Description | Name | Description |
| 8 | +3.3 v | +3.3 v power | JTAG5 | TMS |
| 9 | JTAG1 | +TRST# | +3.3 v | +3.3 v power |
| 10 | +3.3 Vaux | +3.3 v power | +3.3 v | +3.3 v power |
| 11 | WAKE# | Link Reactivate | PWRGD | Power good |
| 12 | RSVD | Reserved | GND | Ground |
| 13 | GND | Ground | REFCLK+ | Reference clock Differential pair |
| 14 | HSOp(0) | Tx Differential pair Lane 1 | REFCLK− | Reference clock Differential pair |
| 15 | HSOn(0) | Tx Differential pair Lane 1 | GND | Ground |
| 16 | GND | Ground | HSIp(0) | Rx Differential pair Lane 1 |
| 17 | PRSNT#2 | Hotplug detect | HSIn(0) | Rx Differential pair Lane 1 |
| 18 | GND | Ground | GND | Ground |

Still referring to FIG. 1, the I/O adapter 20 may include an I/O device port 24 for communicative coupling with one or more I/O devices, one or more processors 30, and a clock unit 36. In addition, the I/O adapter 20 may include a volatile memory 32, a nonvolatile memory 34, registers 40, and firmware 35. In addition, the I/O adapter 20 may include one or more wires, traces, or busses 38, such as an Inter-Integrated Circuit ("I²C") bus, to provide suitable paths for communicating signals between the various devices and modules that may be included in the exemplary I/O adapter 20. Depending on the application, the I/O adapter 20 may be configured to provide any of a wide variety of functions in addition to its primary function of providing an interface to one or more I/O devices. For example, the I/O adapter 20 may provide address translation, buffering, or switching among multiple I/O devices.

The processor 30 may be a CPU or any other suitable processor operable to execute instructions. The processor 30 may include one or more cores, one or more levels of on-board cache, or both components. The instructions the processor executes may be stored either in the volatile memory 32 or the nonvolatile memory 34, or in both locations. The power consumption of the I/O adapter 20 may be correlated with the workload experienced by the adaptor. In particular, the power consumption of the I/O adapter 20 may be correlated with the workload experienced by the processor 30. The processor 30 may consume power in proportion to the workload placed on it. The I/O adapter 20 may use a first level of power in an "active idle" state. An active idle state may be a state in which the adapter generally and the CPU 30, in particular, is not performing any useful work, such as when the CPU 30 is performing a No Operation ("NOP") instruction. (A NOP instruction does not change the state of any registers, status flags, or memory.) A low power or sleep state may be distinguished from an active idle state. In a low power or sleep state, clock frequency, voltage, or both may be scaled down. However, in an active idle state the clock frequency, voltage, or both are typically not scaled down. An active idle state may correspond with a minimum adaptor workload. In contrast, there may be multiple active states that correspond with various adapter workloads above the minimum workload. One example of an active state is when the CPU 30 is executing instructions to perform a mathematical operation. Another example of an active state is when the CPU 30 is executing instructions that read or write data to a cache or a memory.

The clock unit ("CLK") 36 may include any devices suitable or necessary to provide the processor 30, bus 38, or both with one or more clock signals, e.g., a crystal oscillator or a frequency divider. In one alternative, a clock signal may be provided from an external source and the clock unit 36 may be wholly or partially optional.

The volatile memory ("V MEM") 32 may be a random-access semiconductor memory, such as an SRAM, or any other suitable memory. The nonvolatile memory ("NV MEM") 34 may be a ROM, EPROM, flash memory, or any other suitable memory. The firmware 35 may be stored in the nonvolatile memory 34.

The firmware 35 may be stored in the nonvolatile memory 34 by a manufacturer of the I/O adapter 20 using the computer system port 22. The firmware 35 may include instructions and data. The firmware 35 may be written in any suitable programming language. The C and Forth languages are two example languages. The firmware 35 may be compiled before it is stored in memory. Compiled firmware may be referred to as FCode. The I/O adapter 20 may be set up so that the firmware 35 is executed when power is first supplied to the adapter. When the firmware is executed, it may perform tasks necessary to configure the adaptor for normal operations, perform diagnostics, or other similar operations. The firmware for the I/O adapter 20 may be revised from time to time to fix problems or add features. Each revision may be designated with a level or version number. While firmware for an I/O adapter 20 may be revised multiple times over the life of the product, the firmware 35 stored on any particular I/O adapter 20 may not be the most current version.

A manufacturer of computer systems may receive quantities of I/O adapters 20 from a manufacturer of I/O adapters from time to time. The manufacturer of I/O adapters may store (or flash) the firmware 35 into the I/O adapters that it makes. (The firmware 35 may be developed by either the manufacturer of computer systems or the manufacturer of I/O adapters.) The I/O adapters may be placed in inventory and used when needed. This inventory may include I/O adapters having different levels or versions of firmware 35. It is important for the manufacturer of computer systems to know the version or level of the firmware 35 of an I/O adapter before the adapter is installed in a particular system. The firmware version may be determined after installation in a computer system using system software, however, this is a time consuming process. An inexpensive and convenient process for determining the version or level of firmware 35 would be advantageous.

Figure 2:
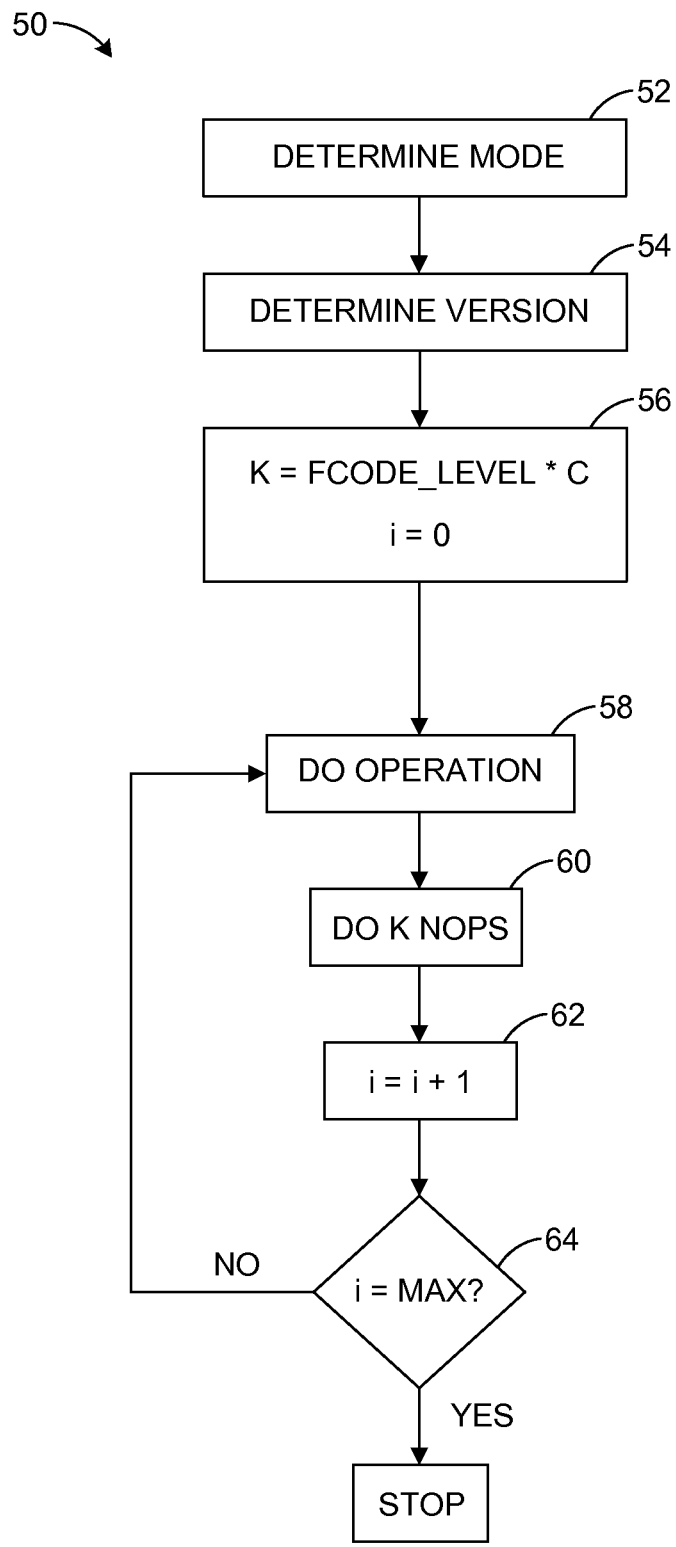
FIG. 2 is a flowchart of a process for providing an indication of the version of firmware in an I/O adapter according to one embodiment.

FIG. 2 is a flowchart of a process 50 for providing an indication of the version or level of firmware 35 in an I/O adapter according to one embodiment. The process may be performed by an I/O adapter 20 executing firmware 35 according to various embodiments. The indication may be detected by a device (described below) external to the I/O adapter 20. The indication may be provided for an I/O adapter 20 having a connector 26 having n pins, n≥2. The indication may be provided in response to connecting particular pins of the connector, but not connecting (or leaving unconnected) at least one of the n pins of the connector 26. The indication may be provided on one or more of the connected pin or pins.

In one embodiment, the firmware 35 may include instructions that cause the I/O adapter 20 to enter one of two modes upon power up. The modes may be (a) a normal mode or (b) a firmware level determining mode. When the I/O adapter 20 is powered up, the processor 30 fetches and executes the firmware 35. One of the initial procedures that the firmware 35 performs or causes to be performed is an operation to determine its mode of operation.

Referring to FIG. 2, a mode of operation may be determined in operation 52. To make this determination, the firmware may include instructions that detect whether one or more particular pins, but not all architected pins 28 of the connector 26 are connected. If only one or more particular pins but not all architected pins 28 are connected, the I/O adapter 20 may enter a firmware level determining mode of operation. On the other hand, if all of the architected pins are connected, the I/O adapter 20 may enter the normal mode of operation. The firmware 35 may include one or more instructions that fetch the analog or logical value on a pin. In addition, the firmware 35 may include one or more instructions that returns either a connected or unconnected state of a pin. In this context, "unconnected" means that the pin is not connected to a circuit located off of or outside of I/O adapter circuitry. It does not mean that the pin is not connected to a circuit internal to or on board the I/O adapter 20.

As mentioned, the firmware 35 may include one or more instructions that returns either a connected or unconnected state of a pin. In one embodiment, an instruction may read a value stored in a register to determine whether or not a pin is connected, where this is supported in the hardware. In an alternative embodiment, the instructions may include a routine that tests whether or not a pin is connected. For example, referring to Table 1, pins 14 and 15 are for connection to a differential pair of transmitting signal lines and pins 16 and 17 are for connection to a differential pair of receiving signal lines. The firmware 35 may transmit test data on pins 14 and 15 that requires an acknowledgement on pins 16 and 17 to determine whether pins 16 and 17 are connected. If an acknowledgement is not received within a particular time period, it may be inferred that the pins 16 and 17 are unconnected.

As one example, referring again to Table 1, the one or more connected pins may be pins 1-4 of an exemplary 1×PCIe connector, in which all architected pins may be pins 1-18. If the pins 1-4 are connected, but at least one of the pins 5-18 is not connected, the I/O adapter 20 may enter a firmware level determining mode of operation. On the other hand, if all of the pins 1-18 are detected, the I/O adapter 20 may enter the normal mode of operation. As may be seen from Table 1, the pins 1-4 include power and ground pins.

As a second example, still referring to Table 1, the one or more unconnected pins may be pin 10 (auxiliary power) of an exemplary 1×PCIe connector. As a third example, the one or more unconnected pins may be pins 13 and 14 (reference clock differential pair). As a fourth example, the one or more unconnected pins may be pins 16 and 17 (receive differential pair). In other embodiments, the one or more unconnected pins may be any suitable pin or pins.

Referring again to FIG. 2, in operation 54, the I/O adapter 20 may determine the version or level of the stored firmware 40. The firmware version may be fetched from the nonvolatile memory 34 or the register 40. Alternatively, the firmware version may be hard coded in the firmware 40.

In the firmware level determining mode of operation, the firmware 35 causes the I/O adapter generally, and the processor 30, in particular, to draw power at one or more particular rates. The particular rate of power drawn may be associated with the version of firmware 35. Different firmware versions may draw power at different rates. In one embodiment, the rate of power drawn may be an average rate of power drawn over a particular time period. In various embodiments, the firmware 35 causes the I/O adapter generally, and the processor 30, in particular, to draw a particular current or cause a particular voltage change. Table 2 illustrates an example of power draw rates and associated firmware versions for the I/O adapter 20.

TABLE 2

| Power draw | Firmware version |
|---|---|
| 7.2 watts | 1 |
| 6.9 watts | 2 |
| 6.6 watts | 3 |
| 6.3 watts | 4 |
| 6.0 watts | 5 |
| 5.5 watts | Active idle |

In operation 56, a time parameter k may be determined. In one embodiment, the time parameter k may be the product of the firmware level times a constant. The constant may be or may correspond with a particular number of clock cycles. For example, if the firmware level is 5 and the constant is 10, the time parameter k may be 50. In this example, if a processor operates at a frequency of 100 kHz, the time parameter k may correspond with approximately 0.0005 s (50÷100,000). The operation 56 may additionally include initializing a loop count variable i.

In an operation 58, one or more procedures may be performed. The operation 58 may include factoring a known set of products of primes, running matrix computations, running a protein folding simulation, or any other operation or operations that drives power consumption of the processor 30. In addition, the operation 58 may include procedures that cause components of the I/O adapter 20 other than, or in addition to, the processor 30 to draw power, e.g., the volatile memory 32. The I/O adapter 20 may draw a power $P_1$ each time operation 58 is performed. The time required by the processor 30 to perform the operation 58 may be a time $T_1$.

In an operation 60, one or more NOP instructions may be executed by the processor 30. In one embodiment, NOP instructions may be executed k times. The time required by the processor 30 to execute k NOPs in the operation 60 may be a time $T_2$. As mentioned, executing NOP instructions may correspond with an active idle state. If the time parameter k corresponds with approximately 0.0005 s, it may be seen that the processor 30 may be in an active idle state for approximately 0.0005 s each time the operation 60 is performed. The power drawn by the I/0 adapter 20 may be a power $P_2$ each time the operation 60 is performed.

In operation 62, the loop count variable i may be incremented. In operation 64, a test may be performed to determine if the loop has be performed a maximum number of times m. The operations 58, 60, and 62 may be repeated m times.

In summary, the I/O adapter 20 may draw a power $P_1$ each time operation 58 is performed and the time required to perform the operation 58 may be a time $T_1$. In addition, the I/O adapter 20 may draw a power $P_2$ each time operation 60 is performed and the time required to perform the operation 60 may be a time $T_2$. If the time parameter k is 50, the processor operates at a frequency of 100 kHz, and the processor executes one instruction per clock cycle, the time $T_2$ for operation 60 may be 0.0005 s. If the processor requires 100 clock cycles to perform operation 58, the time $T_2$ of operation 60 may be 0.001 s. Accordingly, the I/O adapter 20 may be in an active state for 66.67 percent of the time and in an active state for 33.33 percent of the time. If the power $P_1$ is 6.8 w and the power $P_2$ is 5.5 w, the average power for the operations 58 and 60 is 6.3 w. The average power of 6.3 w may be associated with a version 4 of the firmware 35.

Exemplary firmware instructions (in pseudo code form) for the process 50 follows:

```
#define ADPATER_FCODE_LEVEL 7
int main (void)
{
  if(only_special_pins_connected( ))
  {
    do_fcode_level_power_draw( );
  }
  else
  {
    do_normal_startup( );
  }
}
int only_special_pins_connected( )
{
        long pins_connected =get_bitmask_of connected_pci_pins( );
        if (pins_connected +32=0x0000000F) /* 0x0000000F
            would be pins 1-4 */
            return 1;
        return 0;
}
void do_fcode_level_power_draw( )
{
  while(1)
  {
    // Do some computation and then nap
    int y, j, k;
    for (i =0; i <0x1000000; i++)
    {
      y =i * 1+1; /* Exemplary Operation*/
      k =ADAPTER_FCODE_LEVEL * TEN_CLOCK_TICKS;
      for (j =0; j <k; j++); /* Do repeated nops*/
      {
        noop;
      }
    }
  }
}
```

The exemplary firmware instructions above include a loop that is performed 1,000,000 times. The number of loop iterations may be varied in particular embodiments so that the I/O adapter 20 may draw a desired amount of power. The number of loop iterations that are suitable for a particular I/O adapter 20 may be determined with a modest amount of experimentation. Each time this loop performed, an exemplary operation is first performed and then a particular number of NOPs are performed. The exemplary operation in the above instructions is a multiplication. However, any suitable operation may be substituted for the exemplary operation shown. For example, the exemplary operation may be factoring a known set of products of primes, running matrix computations, running a protein folding simulation, or any other suitable operation that drives the power consumption of the processor 30 or the I/O adapter 20. In the example, the particular number of NOPs performed is k, which k equals the adapter firmware level times ten clock ticks. Accordingly, in between steps of the computation, there is a pause for a known period of time in order to relate the power consumption to the firmware level.

When I/O adapter 20 is operating in the firmware level determining mode, a measurement of the power or current drawn, or voltage level, may be taken. For example, the voltage V on the power pins may be known to be 12 volts. Alternatively, the voltage may be measured with a voltmeter. The current I drawn on the pins supplying power to the I/O adapter 20 may be measured using an ammeter. Power P may be calculated using the relation P=I*V. If the frequency of the processor is high and the accuracy of the ammeter is not particularly precise time wise, the ammeter may effectively provide a measurement of average power. Alternatively, the power may be measured using a watt meter. In one embodiment, average power may be measured with an instrument configured to measure average power. An instrument which includes an average power measurement function may periodically sample the instantaneous power drawn by the I/O adapter 20 and store the samples power values. At various intervals, the instrument may sum of the sample values and divide the by the number of samples. Once average power is known, the firmware level may be determined from a table, such as Table 1. In one embodiment, an average power measuring instrument may automatically determine the firmware level using a table lookup function.

In the examples described above, the firmware 35 may cause the I/O adapter 20 to draw power at a rate that is associated with a particular firmware level for a particular amount of time. In one alternative, the firmware 35 may cause the I/O adapter 20 to draw power at a first rate (or average rate) for a first time period and power at a second rate (or average rate) for a second time period. The first and second rates may be associated with a particular version of firmware. For example, a firmware level of 2.1 may indicated by an I/O adapter first drawing an average power of 6.1 w for 30 s, which may be followed by the I/O adapter first drawing an average power of 7.3 w for an additional 30 s. In one alternative, the firmware 35 may cause the I/O adapter 20 to draw current at a first rate (or average rate) for a first time period and current at a second rate (or average rate) for a second time period.

While the embodiments described above associate a particular level or version of firmware 35 with a total rate of power or current drawn by an I/O adapter 20, in other embodiments, a firmware level may be associated with an incremental rate of power or current drawn by an I/O adapter 20. Table 3 illustrates an example of incremental power draw levels and associated firmware versions for the I/O adapter 20.

TABLE 3

| Power draw | Firmware version |
|---|---|
| 1.7 watts | 1 |
| 1.4 watts | 2 |
| 1.1 watts | 3 |
| 0.8 watts | 4 |
| 0.5 watts | 5 |
| — | Active idle |

The power drawn by identical I/O adapters 20 may vary within specified tolerances as a result of variability in components. By associating an incremental average power value with particular firmware levels, slight differences in the power drawn by identical I/O adapters 20 may be normalized.

While the embodiments described above associate a particular level or version of firmware 35 with a total rate of power or current drawn by an I/O adapter 20, in other embodiments, a firmware level may be associated with a metric that corresponds with the product of rate of power or current drawn by an I/O adapter 20 and time. For example, if power is drawn at a constant rate, energy in watt hours is the product of the power in watts and time in hours. In other words, a firmware level may be associated with a particular number of watt hours in one embodiment. One of ordinary skill in the art will appreciate that known devices are available to measure the rate of energy per unit time.

In an embodiment, the firmware 35 includes instructions or statements that execute on the processor 30 or instructions or statements that are interpreted by instructions or statements that execute on the processor 30, to carry out the functions as further described herein. In another embodiment, the firmware 35 may be implemented in hardware via semiconductor devices, chips, logical gates, circuits, circuit cards, and/or other physical hardware devices in lieu of, or in addition to, a processor-based system. In an embodiment, firmware 40 may include data in addition to instructions or statements.

The firmware 35 may include one or more instructions or statements that are resident at various times in various memory and storage devices in the I/O adapter 20 and that, when read and executed by one or more processors in the I/O adapter 20 or when interpreted by instructions that are executed by one or more processors, cause the I/O adapter 20 to perform the actions necessary to execute steps or elements comprising the various aspects of embodiments of the invention. Aspects of embodiments of the invention may be embodied as a system, method, or computer program product. Accordingly, aspects of embodiments of the invention may take the form of an entirely hardware embodiment, an entirely program embodiment (including firmware, resident programs, micro-code, etc., which are stored in a storage device) or an embodiment combining program and hardware aspects that may all generally be referred to herein as a "circuit," "module," or "system." Further, embodiments of the invention may take the form of a computer program product embodied in one or more computer-readable medium(s) having computer-readable program code embodied thereon.

Any combination of one or more computer-readable medium(s) may be utilized. The computer-readable medium may be a computer-readable signal medium or a computer-readable storage medium. A computer-readable storage medium, may be, for example, but not limited to, an electronic, magnetic, optical, electromagnetic, infrared, or semiconductor system, apparatus, or device, or any suitable combination of the foregoing. More specific examples (an non-exhaustive list) of the computer-readable storage media may comprise: an electrical connection having one or more wires, a portable computer diskette, a hard disk, a random access memory (RAM), a read-only memory (ROM), an erasable programmable read-only memory (EPROM) or Flash memory, an optical fiber, a portable compact disc read-only memory (CD-ROM), an optical storage device, a magnetic storage device, or any suitable combination of the foregoing. In the context of this document, a computer-readable storage medium may be any tangible medium that can contain, or store, a program for use by or in connection with an instruction execution system, apparatus, or device.

A computer-readable signal medium may comprise a propagated data signal with computer-readable program code embodied thereon, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that communicates, propagates, or transports a program for use by, or in connection with, an instruction execution system, apparatus, or device. Program code embodied on a computer-readable medium may be transmitted using any appropriate medium, including but not limited to, wireless, wire line, optical fiber cable, Radio Frequency, or any suitable combination of the foregoing.

Computer program code for carrying out operations for aspects of embodiments of the present invention may be written in any combination of one or more programming languages, including object oriented programming languages and conventional procedural programming languages. The program code may execute entirely on the user's computer, partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of embodiments of the invention are described with reference to flowchart illustrations and/or block diagrams of methods, apparatus (systems), and computer program products. Each block of the flowchart illustrations and/or block diagrams, and combinations of blocks in the flowchart illustrations and/or block diagrams may be implemented by computer program instructions embodied in a computer-readable medium. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified by the flowchart and/or block diagram block or blocks. These computer program instructions may also be stored in a computer-readable medium that can direct a computer, other programmable data processing apparatus, or other devices to function in a particular manner, such that the instructions stored in the computer-readable medium produce an article of manufacture, including instructions that implement the function/act specified by the flowchart and/or block diagram block or blocks.

The computer programs defining the functions of various embodiments of the invention may be delivered to a computer system or the I/O adapter 20 via a variety of tangible computer-readable storage media that may be operatively or communicatively connected (directly or indirectly) to the processor or processors. The computer program instructions may also be loaded onto a computer, the I/O adapter 20, other programmable data processing apparatus, or other devices to cause a series of operational steps to be performed on the computer, other programmable apparatus, or other devices to produce a computer-implemented process, such that the instructions, which execute on the computer or other programmable apparatus, provide processes for implementing the functions/acts specified in the flowcharts and/or block diagram block or blocks.

The flowchart and the block diagrams in the figures illustrate the architecture, functionality, and operation of possible implementations of systems, methods, and computer program products, according to various embodiments of the present invention. In this regard, each block in the flowcharts or block diagrams may represent a module, segment, or portion of code, which comprises one or more executable instructions for implementing the specified logical function(s). In some embodiments, the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustration, and combinations of blocks in the block diagrams and/or flow chart illustrations, can be implemented by special purpose hardware-based systems that perform the specified functions or acts, in combinations of special purpose hardware and computer instructions.

Embodiments of the invention may also be delivered as part of a service engagement with a client corporation, non-profit organization, government entity, or internal organizational structure. Aspects of these embodiments may comprise configuring a computer system to perform, and deploying computing services (e.g., computer-readable code, hardware, and web services) that implement, some or all of the methods described herein. Aspects of these embodiments may also comprise analyzing the client company, creating recommendations responsive to the analysis, generating computer-readable code to implement portions of the recommendations, integrating the computer-readable code into existing processes, computer systems, and computing infrastructure, metering use of the methods and systems described herein, allocating expenses to users, and billing users for their use of these methods and systems. In addition, various programs described hereinafter may be identified based upon the application for which they are implemented in a specific embodiment of the invention. But, any particular program nomenclature that follows is used merely for convenience, and thus embodiments of the invention are not limited to use solely in any specific application identified and/or implied by such nomenclature. The exemplary environments illustrated in the figures are not intended to limit the present invention. Indeed, other alternative hardware and/or program environments may be used without departing from the scope of embodiments of the invention.

What is claimed is:

1. A method for providing an indication of a version of a firmware stored in an input/output adapter, comprising:
    detecting, by the input/output adapter, whether a power supply pin is connected to a circuit external to the input/output adapter;
    detecting, by the input/output adapter, whether a clock pin is unconnected to the circuit external to the input/output adapter; and
    providing, by the input/output adapter, the indication if the power supply pin is connected and the clock pin is unconnected, wherein the indication is provided on the first power supply pin.

2. The method of claim 1, wherein the indication is an average rate of power supplied to the input/output adapter.

3. The method of claim 1, wherein the indication is a rate of energy per unit time.

4. The method of claim 1, wherein the indication includes a first average rate of power supplied to the input/output adapter for a first time period and a second average rate of power supplied to the input/output adapter for a second time period.

5. The method of claim 1, wherein the indication is an incremental average rate of power supplied to the input/output adapter.

6. The method of claim 1, wherein the indication is an average rate of current supplied to the input/output adapter.

7. A non-transitory computer readable storage medium having instructions stored thereon which, when executed, cause a processor to perform a method for providing an indication of a version of a firmware stored in an input/output adapter comprising:
    detecting, by the input/output adapter, whether a first power supply pin is connected to a circuit external to the input/output adapter;
    detecting, by the input/output adapter, whether a clock pin is unconnected to the circuit external to the input/output adapter; and
    providing, by the input/output adapter, the indication if the first power supply pin is connected and the clock pin is unconnected, wherein the indication is provided on the power supply pin.

8. The medium of claim 7, wherein the indication is an average rate of power supplied to the input/output adapter.

9. The medium of claim 7, wherein the indication is a rate of energy per unit time.

10. The medium of claim 7, wherein the indication includes a first average rate of power supplied to the input/output adapter for a first time period and a second average rate of power supplied to the input/output adapter for a second time period.

11. The medium of claim 7, wherein the indication is an incremental average rate of power supplied to the input/output adapter.

12. The medium of claim 7, wherein the indication is an average rate of current supplied to the input/output adapter.

* * * * *